Figure 1:
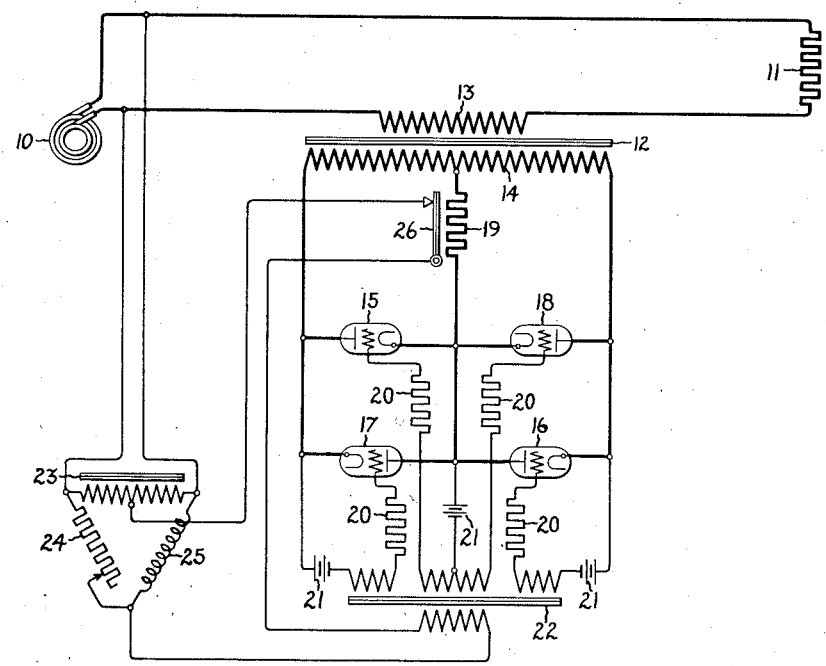

May 30, 1933.　　　H. W. LORD　　　1,912,003

ELECTRIC TRANSLATING CIRCUIT

Filed Nov. 17, 1932

Inventor:
Harold W. Lord,
by Charles V. Mullan
His Attorney.

Patented May 30, 1933

1,912,003

UNITED STATES PATENT OFFICE

HAROLD W. LORD, OF SCHENECTADY, NEW YORK, ASSIGNOR TO GENERAL ELECTRIC COMPANY, A CORPORATION OF NEW YORK

ELECTRIC TRANSLATING CIRCUIT

Application filed November 17, 1932. Serial No. 643,059.

My invention relates to electric translating circuits and more particularly to such circuits including electric valves for controlling the flow of energy from a source of alternating current to a load circuit.

It has heretofore been proposed to control the energy transmitted from a source of alternating current to a load circuit by means of a series connected inductive device or transformer, short circuiting one winding of the inductive device through one or more electric valves, and controlling the conductivity of the valves. Such an arrangement has an advantage over that of connecting the valves directly between the source of current and the load circuit in permitting the operation of the valves at voltages much higher than that of the translating circuit. In such arrangements it is often desirable to handle amounts of power in excess of the rating of commercially available electric valves. In such cases it has been proposed to operate a number of electric valves in parallel or to increase the voltage of the controlled winding of the inductive device and operate a plurality of electric valves in series. In the arrangements of the prior art, however, there have been certain difficulties in securing an equal division of current between a plurality of such valves connected in parallel, or an equal division of inverse voltage between a plurality of electric valves operated in series, with the result that certain of the valves tend to become overloaded or tend to break down under the strain of excessive inverse voltages.

It is an object of my invention, therefore, to provide an improved electric translating circuit for transmitting energy from a source of alternating current to a load circuit through an inductive winding, the impedance of which is controlled by a plurality of electric valves, which will overcome the above-mentioned disadvantages of the arrangements of the prior art and which will be simple and reliable in operation.

It is another object of my invention to provide an improved electric translating circuit for controlling the flow of energy from a source of alternating current to a load circuit by means of an inductive winding and a plurality of electric valves, which will insure a distribution of load between the several electric valves in accordance with their ratings.

It is a further object of my invention to provide an improved electric translating circuit for controlling the energy transmitted between a source of alternating current and a load circuit by means of an inductive winding and a plurality of electric valves in which the valves may be normally controlled to control the flow of energy in the translating circuit and in which the effect of the valve conductivity controlling means is modified in response to a predetermined unbalance in load distribution between the several electric valves.

In accordance with one embodiment of my invention, a source of alternating current and a load circuit are interconnected through the primary winding of a series transformer. The secondary winding of the transformer comprises a plurality of winding portions, each connected to be short circuited through one of a plurality of electric valves connected to conduct during the same half cycles of alternating current. The circuits of the valves are coupled through impedance means so connected that, upon the initiation of current in one of the valves, an overvoltage is impressed on any valve which has failed to conduct. This overvoltage aids in the starting of current in the non-conductive valve, and thus tends to maintain a proper distribution of load between the several valves. In accordance with another feature of my invention, there is provided means for controlling the conductivity of the several electric valves and the action of this conductivity controlling means is modified by means responsive to the flow of unbalance current, as for example by a thermal responsive device associated with the impedance coupling means and effective to render the electric valves non-conductive in response to a predetermined rise in temperature of the impedance device.

Figure 2:
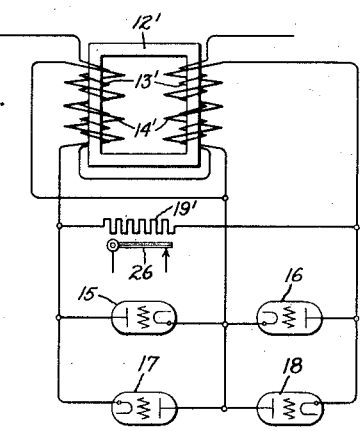

For a better understanding of my invention, together with other and further objects thereof, reference is had to the following description taken in connection with the accompanying drawing and its scope will be pointed out in the appended claims. Fig. 1 of the drawing illustrates an electric translating circuit embodying my invention for energizing a load device from a single phase alternating current circuit, while Fig. 2 shows a modified arrangement for securing a proper distribution of current between the valves.

Referring now more particularly to Fig. 1 of the drawing, there is illustrated an electric translating circuit for transmitting energy from an alternating current source 10 to a load circuit 11. This arrangement includes a series transformer 12 provided with a winding 13 interposed in the connections between the source 10 and the load circuit 11 and a secondary winding 14. There is provided a pair of electric valves 15 and 16 serially connected across the winding 14 to conduct current in one direction and a second pair of electric valves 17 and 18 also serially connected across the winding 14 in parallel to the first pair of valves, and connected to conduct current in an opposite direction. The winding 14 is provided with an electrical midpoint which is connected to the junction of the valves 15 and 16, and 17 and 18 through an impedance device, such, for example, as a resistor 19. Each of the electric valves 15—18, inclusive, is provided with an anode, a cathode and a control grid and may be of any of the several types well known in the art, although I prefer to use valves of the vapor electric discharge type.

In order to control the amount of energy transmitted from the source 10 to the load circuit 11, the grids of the several electric valves 15—18, inclusive, are connected to their respective cathodes through current limiting resistors 20, negative bias batteries 21 and secondary windings of a grid transformer 22. The primary winding of the transformer 22 may be energized from the alternating current source 10 through any suitable phase shifting arrangement, such for example as an impedance phase shifting circuit comprising a mid-tapped reactor 23, a variable resistor 24 and a reactor 25, serially connected across the reactor 23, the primary winding of the grid transformer 22 being connected between the electrical midpoint of the reactor 23 and the junction between resistor 24 and reactor 25, as is well understood by those skilled in the art. In case it is desired to interrupt the operation of the apparatus upon the occurrence of a predetermined unbalance in load between the several electric valves, a thermal relay 26 may be associated with the impedance device 19 which carries the unbalance current of the apparatus, and its contacts connected to interrupt the grid excitation of the several electric valves upon the occurrence of predetermined abnormal conditions:

The general principles of operation of the above-described apparatus will be well understood by those skilled in the art. In brief, if the potentials impressed upon the grids of the several electric valves 15—18, inclusive, are substantially in phase with their respective anode potentials so that these valves are fully conductive, the winding 14 is directly short circuited therethrough during both half cycles of alternating current, the effective impedance of the transformer 12 in the electric translating circuit is a minimum, and the energization of the load circuit 11 is a maximum. By successively retarding the phase of the grid potentials of the several electric valves 15—18, inclusive, by means of the variable resistor 24 included in the impedance phase shifting circuit, each of the valves will be rendered conductive at some later point in its positive half cycles of anode potential and its effective impedance increased, thus increasing the effective impedance of the series transformer 12 and reducing the energization of the load circuit 11. It will, of course, be understood that in case sufficient inductance is included in the electric translating circuit, current will be maintained in each of the several electric valves after the alternating current supply potential has reversed polarity, the current being maintained by the voltage of the inductance. However, in such a case, since the current flows during a portion of each cycle against the electromotive force of the supply circuit, the effective impedance of the series transformer 12 will be correspondingly increased.

If it be assumed that, initially, the left-hand terminal of the winding 14 is positive and electric valves 15 and 16 are rendered conductive at any predetermined point in their positive half cycles of anode potential, it may sometimes occur that one of the electric valves, for example, the valve 15, may become conductive before the other valve. If the resistor 19 were omitted, it will be seen that the left-hand portion of the winding 14 would be directly short circuited through electric valve 15 so that the terminal potential of the right-hand portion of the winding 14 would be substantially reduced, thus tending to prevent the starting of the current in electric valve 16. Such an operation would, of course, overload electric valve 15 and underload electric valve 16, and if such a condition obtained for any considerable period it might have destructive effects on the overloaded electric valve. With the resistor 19 included in the circuit as illustrated, however, if electric valve 15 becomes conductive before electric valve 16, the greater portion of the potential of the left-hand portion of the winding 14 will now appear across the resistor 19 making its lower terminal positive. The voltage now tending to initiate a discharge in electric valve 16 is the sum of the potential across the resistor 19 and that of the right-hand portion of the winding 14. By properly proportioning the resistor 19, the tendency of an electric valve of either of the pairs of valves 15 and 16, 17 and 18, to become conductive before the other valve, either regularly or irregularly, may be substantially eliminated. For example, in a particular installation, I have found that a satisfactory value of the resistance 19 is such as to cause approximately 10 per cent of the rated voltage of each portion of the secondary winding 14 to appear across the resistance 19 when full load current flows.

If, in spite of the balancing effect of the resistor 19, one of the electric valves continues to carry more than its share of the current, the unbalance current will flow in the resistor 19. By associating the thermal relay 26 with the resistor 19 and connecting its contacts in series with the primary winding of grid transformer 22, the grid excitation of the several electric valves will be removed upon the occurrence of predetermined abnormal unbalance for a predetermined time interval and the negative bias batteries in the grid circuits of the several electric valves will render them non-conductive. Obviously, when the electric valves become non-conductive, the current flowing to the load circuit 11 will be limited by the exciting impedance of the transformer 12 and be reduced to a negligible value.

In the above-described translating circuit it has been assumed that the transformer 12 is a standard type with negligible leakage reactance between the several windings. In case a considerable leakage reactance is provided between the two portions of the windings 14, as for example by winding them on separate legs of the transformer core, the impedance of the resistor 19 may be materially reduced and, in case this leakage reactance is increased sufficiently, the impedance 19 may be entirely eliminated. With such an arrangement the transformer 12 acts as a combined power translating device and an impedance coupling between the circuits of the two groups of valves. If one of the valves, for example, the valve 15, becomes conductive before the valve 16, the current flowing in the left-hand portion of the winding 14 does not completely neutralize the flux linking the right-hand portion of the winding 14 with the result that a voltage still obtains across this portion of the winding effective to start the current in electric valve 16, the magnitude of this voltage, of course, depending upon the amount of leakage reactance between the two portions of the winding 14. One such arrangement is illustrated in Fig. 2 of the drawing in which the two portions 14' of the secondary winding of the transformer 12' and their associated primary winding portions 13' are mounted on separate legs of the transformer core, a well-known arrangement for introducing substantial leakage reactance between multiple transformer windings. In view of the fact that the two portions of the primary winding 13' are connected in series, if one of the electric valves, for example, the valve 15, becomes conductive to short circuit the left-hand winding portion 14', a voltage will appear across the right-hand winding portion 14' dependent upon the amount of leakage reactance between the two winding portions 14' and this voltage will be effective to initiate a current in electric valve 16. In this arrangement also, the transformer windings have been reconnected in order to reduce the maximum voltage appearing between different portions of the electric valve circuit. This is accomplished by connecting the two winding portions 14' so that their two outside terminals are at the same polarity with respect to their common terminal, which is connected to the junctions of the pairs of valves 15 and 16, and 17 and 18. With such an arrangement the common connection of the two winding portions now carries the full load current of both of the electric valves of each pair, rather than the unbalance current as in the arrangement of Fig. 1, so that an external impedance included in this common connection would not be effective to assist in balancing the current between the valves of each group. With such an arrangement an indication of the unbalance between the valves of each group may be obtained by means of an impedance device 19' connected between the outer terminals of the winding portions 14'. A thermal responsive device 26 may be associated with impedance device 19', as in the arrangement of Fig. 1, to control the grid excitation circuits of the several electric valves, as in the arrangement of Fig. 1.

While I have illustrated my invention as applied to the control of an electric translating circuit by means of a pair of inductive winding portions, each short circuited through an electric valve, it will be obvious to those skilled in the art that it is equally applicable to such control by means of a plurality of inductive winding portions, each short circuited through an electric valve, as for example by providing the winding 14 of Fig. 1 with a plurality of intermediate terminals. With such an arrangement balancing impedances may be connected between the intermediate terminals and the junctions between the several electric valves. It will also be apparent to those skilled in the art that the spacing of the intermediate terminal or terminals, that is, the voltage of the several winding portions, will be determined by the ratings of their associated electric valves.

While I have described what I at present consider the preferred embodiments of my invention, it will be obvious to those skilled in the art that various changes and modifications may be made without departing from my invention, and I therefore aim in the appended claims to cover all such changes and modifications as fall within the true spirit and scope of my invention.

What I claim as new and desire to secure by Letters Patent of the United States is:

1. An electric translating circuit comprising a source of alternating current, a load circuit, means for controlling the flow of energy from said source to said load circuit including a plurality of inductive winding portions, a plurality of electric valves each connected across one of said winding portions with such polarity as normally to conduct during the same portions of the waves of alternating potential, and means for maintaining a predetermined division of load between said valves comprising an impedance coupling between the circuits of said electric valves.

2. An electric translating circuit comprising a source of alternative current, a load circuit, means for controlling the flow of energy from said source to said load circuit including a plurality of inductive winding portions, a plurality of electric valves each connected across one of said winding portions with such polarity as normally to conduct during the same portions of the waves of alternating potential, and means for maintaining a predetermined division of load between said valves comprising coupling means interconnecting the circuits of said valves and responsive to the initiation of current in one of said valves for increasing the voltage across a non-conductive valve.

3. An electric translating circuit comprising a source of alternating current, a load circuit, means for controlling the flow of energy from said source to said load circuit including an inductive winding and a plurality of electric valves serially connected across said winding in the same conductive direction, said winding being provided with an intermediate terminal, and means for securing an equal division of load between said valves comprising an impedance device connected between said intermediate terminal and the junction between two of said valves.

4. An electric translating circuit comprising a source of alternating current, a load circuit, means for controlling the flow of energy from said source to said load circuit including an inductive winding provided with an electrical midpoint and a pair of electric valves serially connected across said winding in the same conductive direction, and means for securing an equal division of load between said valves comprising a resistance device connected between said midpoint and the junction between said pair of valves.

5. An electric translating circuit comprising a source of alternating current, a load circuit, means for controlling the flow of energy from said source to said load circuit including an inductive winding provided with an intermediate terminal and two groups of serially connected electric valves, said groups of valves being connected in parallel across said winding in opposite conductive directions, and means for securing an equal division of load between said valves comprising an impedance device connected between said intermediate terminal and the junctions between two corresponding valves of said groups.

6. An electric translating circuit comprising a source of alternating current, a load circuit, means for controlling the flow of energy from said source to said load circuit including an inductive winding provided with an electrical midpoint and two pairs of serially connected electric valves, said pairs of valves being connected in parallel across said winding in opposite conductive directions, and means for securing an equal division of load between said valves comprising a resistance device connected between said midpoint and the junctions between the valves of said pairs.

7. An electric translating circuit comprising a source of alternating current, a load circuit, a series transformer provided with a winding interconnecting said source and said load circuit and a second winding having an intermediate terminal, a plurality of electric valves serially connected across said second winding in the same conductive direction, and means for securing an equal division of load between said valves comprising an impedance device connected between said intermediate terminal and the junction between two of said valves.

8. An electric translating circuit comprising a source of alternating current, a load circuit, means for controlling the flow of energy from said source to said load circuit including a plurality of inductive winding portions, a plurality of valves, each connected across one of said winding portions with such a polarity as to be normally conductive during the same portions of the waves of alternating potential, and means for maintaining a predetermined division of load between said valves comprising a magnetic core member provided with a separate leg for each of said windings for coupling said windings with substantial leakage reactance therebetween, and series connected energizing windings for said core member, each associated with one of said first-mentioned windings.

9. An electric translating circuit comprising a source of alternating current, a load circuit, means for controlling the flow of energy from said source to said load circuit including a plurality of inductive winding portions, a plurality of electric valves each connected across one of said winding portions with such polarity as normally to conduct during the same portions of the waves of alternating potential, means for controlling the conductivity of said valves, means for maintaining a predetermined division of load between said valves, and means responsive to a predetermined unbalance between the currents through said valves for modifying the effect of said conductivity controlling means.

10. An electric translating circuit comprising a source of alternating current, a load circuit, means for controlling the flow of energy from said source to said load circuit including a plurality of inductive winding portions, a plurality of electric valves each connected across one of said winding portions with such a polarity as normally to conduct during the same portions of the waves of alternating potential, means for controlling the conductivity of said valves, means for securing a predetermined division of load between said valves comprising impedance means coupling the circuits of said valves, and means responsive to a predetermined energization of said impedance means for modifying the action of said conductivity controlling means.

11. An electric translating circuit comprising a source of alternating current, a load circuit, means for controlling the flow of energy from said source to said load circuit including a plurality of inductive winding portions, a plurality of electric valves each connected across one of said winding portions with such a polarity as normally to conduct during the same portions of the waves of alternating potential, means for controlling the conductivity of said valves, means for securing an equal division of load between said valves comprising impedance means coupling the circuits of said valves, and means responsive to a predetermined flow of current in said impedance means for rendering said valves non-conductive.

12. An electric translating circuit comprising a source of alternating current, a load circuit, means for controlling the flow of energy from said source to said load circuit including a plurality of inductive winding portions, a plurality of grid controlled electric valves each connected across one of said winding portions with such a polarity as normally to conduct during the same portions of the waves of alternating potential, a grid excitation circuit for each of said valves, means for securing an equal division of load between said valves comprising impedance means coupling the circuits of said valves, and a thermal responsive device associated with said impedance means and effective to deenergize said grid excitation circuits in response to a predetermined rise in temperature of said impedance device.

13. An electric translating circuit comprising a source of alternating current, a load circuit, means for controlling the flow of energy from said source to said load circuit including a plurality of inductive winding portions, a plurality of electric valves, each connected across one of said winding portions with such a polarity as to be normally conductive during the same portions of the waves of alternating potential, means for controlling the conductivity of said valves, a magnetic coupling between the circuits of said valves for normally maintaining a predetermined division of current therebetween, an impedance device responsive to an unbalance of current between said valves, and means responsive to a predetermined energization of said impedance device for modifying the action of said conductivity controlling means.

In witness whereof I have hereunto set my hand.

HAROLD W. LORD.